United States Patent
Hwang et al.

(10) Patent No.: US 9,240,688 B2
(45) Date of Patent: Jan. 19, 2016

(54) ULTRASONIC WIRELESS POWER TRANSMITTER AND RECEIVER APPARATUSES, AND METHOD FOR WIRELESS CHARGING THEREOF

(71) Applicant: Electronics and Telecommunications Research Institute, Daejeon (KR)

(72) Inventors: Gunn Hwang, Seoul (KR); Sung Q Lee, Daejeon (KR); Woo Seok Yang, Daejeon (KR); JongDae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 516 days.

(21) Appl. No.: 13/671,486

(22) Filed: Nov. 7, 2012

(65) Prior Publication Data
US 2013/0271088 A1    Oct. 17, 2013

(30) Foreign Application Priority Data
Apr. 16, 2012  (KR) .................. 10-2012-0039320

(51) Int. Cl.
H02J 7/00 (2006.01)
H01F 27/42 (2006.01)
H02J 4/00 (2006.01)
H04B 11/00 (2006.01)
H02J 17/00 (2006.01)
H02J 7/02 (2006.01)

(52) U.S. Cl.
CPC .............. H02J 4/00 (2013.01); H02J 7/0052 (2013.01); H02J 17/00 (2013.01); H04B 11/00 (2013.01); H02J 7/025 (2013.01); Y02B 60/50 (2013.01)

(58) Field of Classification Search
CPC ...................................................... H02J 7/025
USPC ......................................................... 320/108
See application file for complete search history.

(56) References Cited

U.S. PATENT DOCUMENTS

| | | | |
|---|---|---|---|
| 2003/0121331 A1* | 7/2003 | Mitsuoka et al. ............... | 73/632 |
| 2010/0097036 A1* | 4/2010 | Wakayama ................ | 320/153 |
| 2011/0218594 A1 | 9/2011 | Doron et al. | |
| 2012/0299542 A1* | 11/2012 | Perry ............................. | 320/108 |
| 2014/0221767 A1* | 8/2014 | Olson et al. ................... | 600/300 |

FOREIGN PATENT DOCUMENTS

| | | |
|---|---|---|
| JP | 2011-023923 A | 2/2011 |
| KR | 1020110062219 A | 6/2011 |

OTHER PUBLICATIONS

Moo-Kwang Byeon et al., "Design and Implementation of High-Speed Communication Modem Using Ultrasonic Sensors for Underwater Sensor Networks", 2008, IEEE.

* cited by examiner

Primary Examiner — Edward Tso
Assistant Examiner — Ahmed Omar (57) ABSTRACT

Disclosed are ultrasonic wireless power transmitter and receiver apparatuses, and a method for wireless charging thereof. A method for wireless charging according to the present disclosure includes: transmitting, by an ultrasonic wireless power transmitter apparatus, an wakeup signal to an ultrasonic wireless power receiver apparatus; calculating, by the ultrasonic wireless power transmitter apparatus, a charging time according to a charging status information received from the ultrasonic wireless power receiver apparatus; generating, by the ultrasonic wireless power transmitter apparatus, an ultrasonic signal, amplifying the generated ultrasonic signal to predetermined voltage and thereafter; charging, by the ultrasonic wireless power transmitter apparatus, the ultrasonic wireless power receiver apparatus for the calculated time and thereafter; and determining, by the ultrasonic wireless power transmitter apparatus, whether secondary charging is to be performed according to a charged status information received from the ultrasonic wireless power receiver apparatus.

14 Claims, 6 Drawing Sheets

ULTRASONIC WIRELESS POWER TRANSMITTER AND RECEIVER APPARATUSES, AND METHOD FOR WIRELESS CHARGING THEREOF

CROSS-REFERENCE TO RELATED APPLICATIONS

This application is based on and claims priority from Korean Patent Application No. 10-2012-0039320, filed on Apr. 16, 2012, with the Korean Intellectual Property Office, the disclosure of which is incorporated herein in its entirety by reference.

TECHNICAL FIELD

The present disclosure relates to ultrasonic wireless power transmitter and receiver apparatuses, and a method for wireless charging thereof, and particularly, to ultrasonic wireless power transmitter and receiver apparatuses that wirelessly transmit energy by using ultrasound and store the same and a method for wireless charging thereof.

BACKGROUND

As a study on a sensor network becomes active, the necessity of a study on an issue of wirelessly supplying power to each sensor node has been gradually increased. Wireless power transmitter technologies using magnetic resonance field or an electromagnetic induction coupling field are not free in human harmfulness. Therefore, as a solution thereto, an ultrasonic power transmission method is relieved as an alternative.

Researches on an ultrasonic wireless power transmission apparatus have been conducted on a basic study level, and studies on a communication scheme or method using an ultrasonic wireless power apparatus have also been conducted only in a very limited application field.

In researches using the ultrasound for data communication underwater, studies on a underwater channel characteristic and underwater ultrasonic communication have been conducted and based thereon, the high power/high-priced ultrasonic communication modem technologies with various modulation/demodulation techniques and signal processing algorithms have been developed.

A first related art is disclosed in US2011/0218594A1 (Ultrasonic Transducer for Bi-directional Wireless Communication, Eyal Doron) specifying a communication system by using an ultrasonic apparatus transmitting power by using an ultrasonic element. An energy power transmission apparatus using ultrasound, which is provided between an internal apparatus incorporated in a human body and an external apparatus, and a bidirectional communication method using the apparatus were proposed.

A second related art is disclosed in US 2011/0134725A1 (Ultrasonic System and Communication Method Thereof, Chung-Yi Su). A burst transmitter method synchronized with a communication method in an ultrasonic transmitter/receiver system is used.

SUMMARY

The present disclosure has been made in an effort to provide the structures and communication procedures of an ultrasonic wireless power transmitter apparatus and an ultrasonic wireless power receiver apparatus which transmit wireless power by using ultrasound and are used in transmitting ultrasonic power in order to improve transmission efficiency at the time of transmitting wireless power.

An exemplary embodiment of the present disclosure provides an ultrasonic wireless power transmitter apparatus, including: ultrasound generating unit configured to generate an ultrasonic signal for transmitting power; a signal processing unit configured to modulate the ultrasonic signal; a power amplifying unit configured to amplify the modulated ultrasonic signal to a predetermined magnitude; an ultrasonic transmitter/receiver unit configured to transmit the power-amplified ultrasonic signal to an ultrasonic wireless power receiver apparatus or receive an ultrasonic signal for transmitting data from the ultrasonic wireless power receiver apparatus; and a control unit configured to calculate a charging time by using power amount data received from the ultrasonic wireless power receiver apparatus and calculate a natural frequency by considering a distance from the ultrasonic wireless power receiver apparatus and the size of the ultrasonic transmitter/receiver unit.

Another exemplary embodiment of the present disclosure provides an ultrasonic wireless power receiver apparatus, including: an ultrasonic transmitter/receiver unit configured to receive an ultrasonic signal for transmitting power from an ultrasonic wireless power transmitter apparatus or transmit an ultrasonic signal for transmitting data to the ultrasonic wireless power transmitter apparatus; a power managing unit configured to store power generated by using the ultrasonic signal for transmitting power in a power storing unit and measure a power amount stored in the power storing unit; and a control unit configured to control power amount data received from the power managing unit to be transmitted to the ultrasonic wireless power transmitter apparatus.

Yet another exemplary embodiment of the present disclosure provides a method for wireless charging using ultrasound in an ultrasonic wireless power transmitter apparatus, including: transmitting, by an ultrasonic wireless power transmitter apparatus, an ultrasonic signal for actuation to an ultrasonic wireless power receiver apparatus; calculating, by the ultrasonic wireless power transmitter apparatus, a charging time by receiving the charging status from the ultrasonic wireless power receiver apparatus, and transmitting a charging start signal to the ultrasonic wireless power receiver apparatus; generating, by the ultrasonic wireless power transmitter apparatus, an ultrasonic signal, amplifying the generated ultrasonic signal to predetermined voltage and thereafter, transmitting the power to the receiver when receiving a notification of completion of charging preparation from the ultrasonic wireless power receiver apparatus; charging, by the ultrasonic wireless power transmitter apparatus, the ultrasonic wireless power receiver apparatus for the calculated time and thereafter, notifying the ultrasonic wireless power receiver apparatus that primary charging is completed; and determining, by the ultrasonic wireless power transmitter apparatus, whether secondary charging is to be performed according to a charging amount received from the ultrasonic wireless power receiver apparatus.

Still another exemplary embodiment of the present disclosure provides a method for wireless charging using ultrasound in an ultrasonic wireless power transmitter apparatus, including: transmitting, by an ultrasonic wireless power transmitter apparatus, an wakeup signal to an ultrasonic wireless power receiver apparatus; transmitting, by the ultrasonic wireless power transmitter apparatus, a charging start signal to the ultrasonic wireless power receiver apparatus when receiving a notification of completion of wakeup from the ultrasonic wireless power receiver apparatus; emitting, by the ultrasonic wireless power transmitter apparatus, ultrasound in a predetermined frequency range when receiving completion of charging preparation from the ultrasonic wireless power receiver apparatus; receiving, by the ultrasonic wireless power transmitter apparatus, a notification of a frequency to generate the highest voltage from the ultrasonic wireless power receiver apparatus; transmitting, by the ultrasonic wireless power transmitter apparatus, ultrasound having the notified frequency while changing the position of an ultrasonic element within the range of a predetermined distance (D0±D1) and direction (±θ, ±α); and transmitting, by the ultrasonic wireless power transmitter apparatus, the ultrasound having the notified frequency and charging the ultrasonic wireless power receiver apparatus for an estimated charging time after setting the position of the ultrasonic transmitter apparatus to the optimal distance and direction when receiving the information of the optimal distance and direction of the transmitter apparatus, and an estimated charging time from the ultrasonic wireless power receiver apparatus.

According to the exemplary embodiments of the present disclosure, an ultrasonic wireless communication system in wireless power transmitter maximizes transmitter efficiency and directionality of ultrasonic energy by using a method and an apparatus for ultrasonic communication in an ultrasonic wireless transmitter apparatus which is operated in a medium represented by air, a human body or water.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
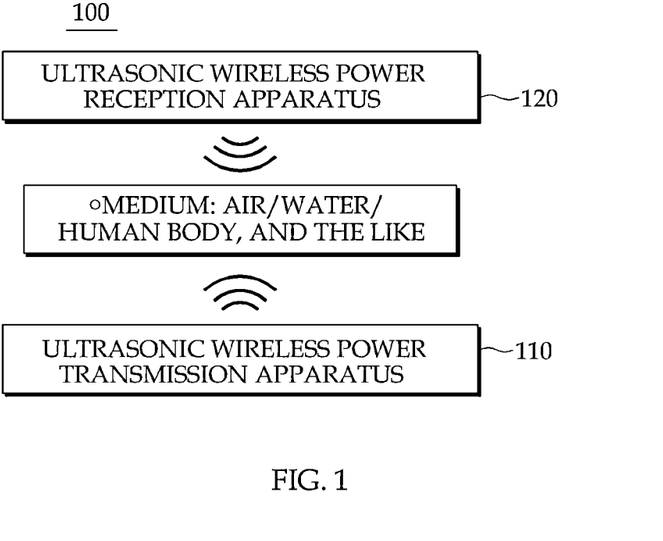
FIG. 1 illustrates an ultrasonic wireless communication system according to an exemplary embodiment of the present disclosure.

FIG. 1 illustrates an ultrasonic wireless communication system according to an exemplary embodiment of the present disclosure. Hereinafter, the ultrasonic wireless communication system according to the exemplary embodiment of the present disclosure will be described in detail with reference to FIG. 1.

According to FIG. 1, an ultrasonic wireless communication system 100 includes an ultrasonic wireless power transmitter apparatus 110 and an ultrasonic wireless power receiver apparatus 120. Of course, the ultrasonic wireless communication system may further include other components in addition to the components.

The ultrasonic wireless power transmitter system 100 is a system for supplying power to a sensor network in air or under water, or in-human body devices. The ultrasonic wireless power transmitter system 100 uses a unique radiation plate structure having a stepped plate structure in order to increase transmission efficiency and in such a transmission scheme, a predetermined natural frequency having the maximum efficiency is used by considering a distance and the size of the stepped plate of the transmitter apparatus. In the ultrasonic wireless power transmitter system, the ultrasonic wireless power transmitter apparatus 110 checks a charging status of the ultrasonic wireless power receiver apparatus 120 in order to increase charging efficiency while charging power. The ultrasonic wireless power transmitter apparatus 110 ends the power transmission when charging of the ultrasonic wireless power receiver apparatus 120 is completed. The ultrasonic wireless power transmitter apparatus 110 and the ultrasonic wireless power receiver apparatus 120 enter a sleep mode in order to reduce power consumption of the ultrasonic wireless power transmitter apparatus 110 and the ultrasonic wireless power receiver apparatus 120 when wireless power transmission procedures have been completed.

The ultrasonic wireless power transmitter apparatus 110 sends an ultrasonic signal for actuating the ultrasonic wireless power receiver apparatus 120 to the ultrasonic wireless power receiver apparatus 120 when wireless power charging is started, and the ultrasonic wireless power receiver apparatus 120 receiving the ultrasonic signal begins to be actuated. The ultrasonic wireless power receiver apparatus 120 replies ready signal to a transmitter apparatus and sends the received signal information including an amplitude and a phase of the ultrasound, and a charging status of a battery unit. The ultrasonic signal used at that time may be transmitted through various modulation schemes to continuously change an amplitude, a frequency, or phase of a carrier or an amplitude or a position of a pulse, or the like.

The ultrasonic wireless power transmitter apparatus 110 calculates a charging time and transmits a charging start signal to the ultrasonic wireless power receiver apparatus 120 according to the charging status of the battery unit in the ultrasonic wireless power receiver apparatus 120. When the ultrasonic wireless power receiver apparatus 120 receives the charging start signal, the ultrasonic wireless power receiver apparatus 120 is switched to a charging mode and notifies the ultrasonic wireless power transmitter apparatus 110 that charging preparation is completed.

When receiving a charging preparation completion signal from the ultrasonic wireless power receiver apparatus 120, the ultrasonic wireless power transmitter apparatus 110 starts charging. The ultrasonic wireless power transmitter apparatus 110 amplifies the generated ultrasonic signal to predetermined voltage and thereafter, sends ultrasound to the receiver apparatus 120 with the amplified voltage. The ultrasonic wireless power transmitter apparatus 110 performs charging for the calculated time and thereafter, notifies to the ultrasonic wireless power receiver apparatus 120 that primary charging is completed.

The ultrasonic wireless power receiver apparatus 120 checks the charged amount information of the power storing unit 121 and transmits the status of the power storing unit 121 to the ultrasonic wireless power transmitter apparatus 110. The ultrasonic wireless power transmitter apparatus performs charging by calculating an additional charging time when charging is short based on the received charging amount and when the charging is completed, the ultrasonic wireless power transmitter apparatus notifies to the ultrasonic wireless power receiver apparatus 120 that the charging is completed.

When the charging is completed, the ultrasonic wireless power transmitter apparatus commands the ultrasonic wireless power receiver apparatus 120 to change the actuation mode to the sleep mode and thereafter, the ultrasonic wireless power transmitter power itself also enters the sleep mode.

Figure 2:
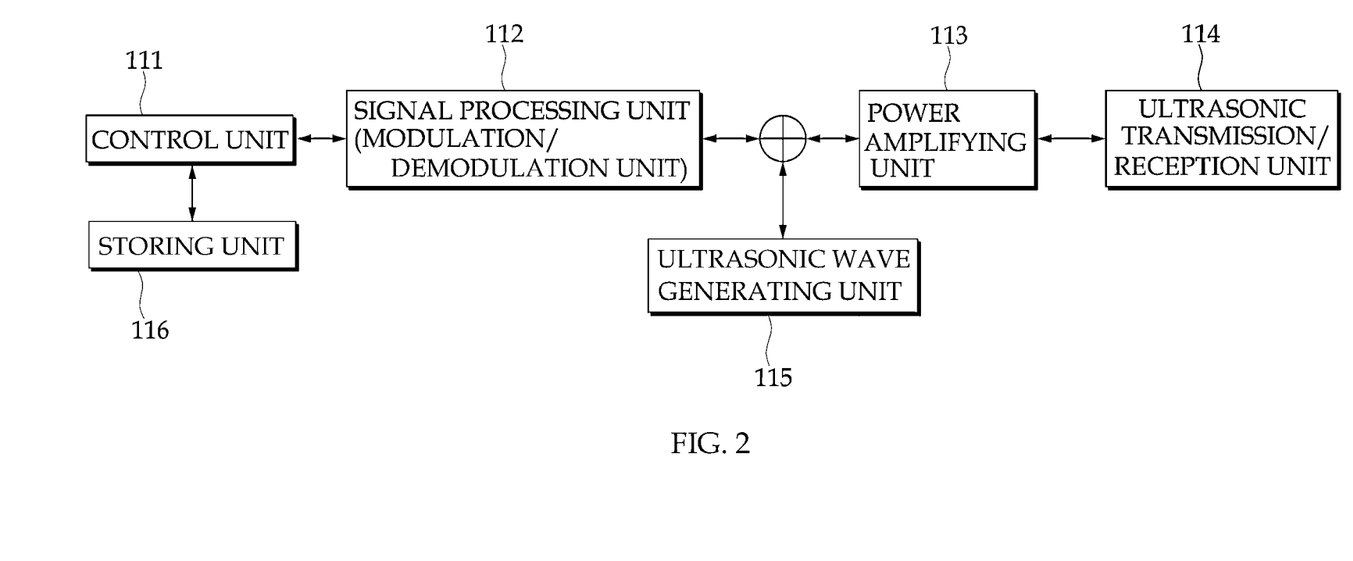
FIG. 2 is a block diagram illustrating a configuration of an ultrasonic wireless power transmitter apparatus according to an exemplary embodiment of the present disclosure.

FIG. 2 is a block diagram illustrating a configuration of an ultrasonic wireless power transmitter apparatus according to an exemplary embodiment of the present disclosure. Hereinafter, a configuration of the ultrasonic wireless power transmitter apparatus according to the exemplary embodiment of the present disclosure will be described in detail with reference to FIG. 2.

The ultrasonic wireless power transmitter apparatus includes a control unit, a storing unit, a signal processing unit, ultrasound generating unit, a power amplifying unit and an ultrasonic transmitter/receiver unit. Of course, it is apparent that the ultrasonic wireless power transmitter apparatus may further include other component in addition to the components.

The control unit 111 sends an actuation signal to the ultrasonic wireless power receiver apparatus to actuate the ultrasonic wireless power receiver apparatus when power supplying to the ultrasonic wireless power receiver apparatus is required, and checks the power amount charged in the ultrasonic wireless power receiver apparatus to calculate the charging time. The control unit 111 controls the respective components to transmit power for the calculated charging time. That is, the control unit 111 commands the ultrasound generating unit 115 to generate the ultrasound by controlling the ultrasound generating unit 115 and allows the power amplifying unit 113 to amplify the generated ultrasound to a predetermined magnitude by controlling the power amplifying unit 113. The control unit 111 controls the ultrasonic transmitter/receiver unit 114 to transmit the ultrasonic signal to the outside or receive the ultrasonic signal from the outside. The control unit 111 calculates a natural frequency having the maximum efficiency by considering a distance between the ultrasonic wireless power transmitter apparatus and the ultrasonic wireless power receiver apparatus, and the size of the ultrasonic element (radiation plate). Besides, the control unit 111 controls the mode of the ultrasonic wireless power transmitter apparatus.

The storing unit 116 stores programs required to actuate the ultrasonic wireless power transmitter apparatus and stores programs required to calculate the charging time by using a remaining charging amount received from the ultrasonic wireless power receiver apparatus associated with the present disclosure.

The signal processing unit 112 modulates the ultrasonic signal or demodulates data received from an external apparatus to output data.

The ultrasound generating unit 115 generates the ultrasonic signal for transmitting wireless power to the ultrasonic wireless power receiver apparatus. The ultrasound generated by the ultrasound generating unit 115 is added up with the signal processed by the signal processing unit 112 to be transferred to the power amplifying unit 113.

The power amplifying unit 113 amplifies a received data signal to an ultrasonic signal having a predetermined magnitude and thereafter, transfers the amplified signal to the ultrasonic transmitter/receiver unit 114.

The ultrasonic transmitter/receiver unit 114 transmits the ultrasonic signal output from the power amplifying unit 113 to the outside or receives the ultrasonic signal from the external apparatus.

As such, the ultrasonic wireless power transmitter apparatus of the present disclosure checks a power amount charged in the ultrasonic wireless power receiver apparatus by using the ultrasonic signal received from the ultrasonic wireless power receiver apparatus to calculate the charging time, and supplies power required by the ultrasonic wireless power receiver apparatus by using the ultrasound for the calculated charging time. That is, when the power supplying to the ultrasonic wireless power receiver apparatus is required periodically or non-periodically, the ultrasonic wireless power transmitter apparatus sends the actuation signal to the ultrasonic wireless power receiver apparatus to actuate the ultrasonic wireless power receiver apparatus and transmit a required power amount after checking the power amount from the ultrasonic wireless power receiver apparatus.

Figure 3:
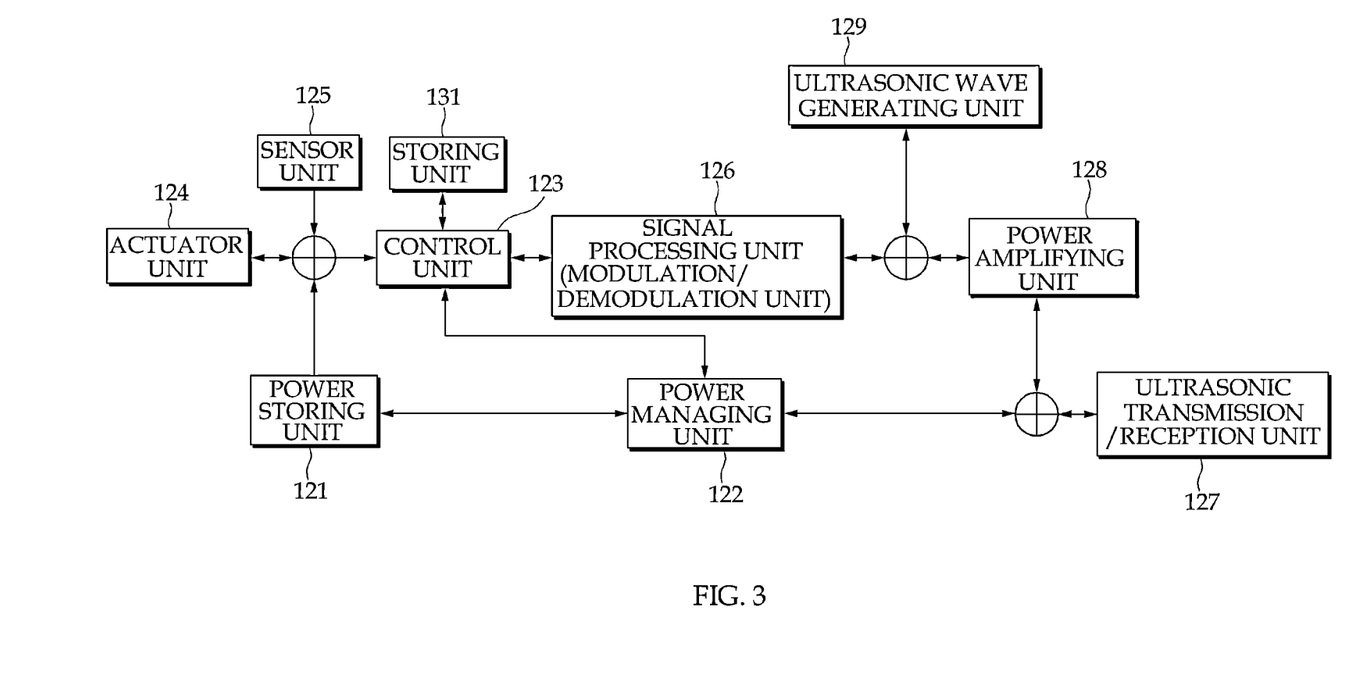
FIG. 3 is a block diagram illustrating a configuration of an ultrasonic wireless power receiver apparatus according to an exemplary embodiment of the present disclosure.

FIG. 3 is a block diagram illustrating a configuration of an ultrasonic wireless power receiver apparatus according to an exemplary embodiment of the present disclosure. Hereinafter, a configuration of the ultrasonic wireless power receiver apparatus according to the exemplary embodiment of the present disclosure will be described in detail with reference to FIG. 3.

According to FIG. 3, the ultrasonic wireless power receiver apparatus includes a power storing unit, a power managing unit, a control unit, an actuator, a sensor unit, a storing unit, a signal processing unit, ultrasound generating unit, a power amplifying unit, and an ultrasonic transmitter/receiver unit. Of course, it is apparent that the ultrasonic wireless power receiver apparatus may further include other components in addition to the components.

The power storing unit 121 is configured by a rechargeable battery or a capacitor and stores required electric power.

The power managing unit 122 manages power supplied to the ultrasonic wireless power receiver apparatus and stores the power produced by using the ultrasonic wave received from the external apparatus in the power storing unit 121. The power managing unit 122 measures the power amount stored in the power storing unit 121 and transmits measured associated data to the control unit 123.

When the control unit 123 receives the wakeup signal from the external ultrasonic wireless power transmitter apparatus, the control unit 123 is actuated to actuate the ultrasonic wireless power receiver apparatus, and checks the power amount stored in the internal power storing unit 121 to transmit the associated data to the external ultrasonic wireless power transmitter apparatus. The control unit 123 manages the power produced by the ultrasonic wave received from the ultrasonic wireless power transmitter apparatus to be charged in the power storing unit 121. Besides, the control unit 123 controls the respective components constituting the ultrasonic wireless power receiver apparatus.

The actuator unit 124 receives a command from the control unit 123 to perform a predetermined action to the outside. The sensor unit 125 includes one or more sensors to measure a surrounding environment state from the sensors and collect the data.

The signal processing unit 126 modulates/demodulates data sensed according to the control command of the control unit 123 to output the modulated/demodulated data as a data signal. Besides, the signal processing unit 126 modulates and sends the data associated with the power amount received from the power managing unit 122.

The ultrasound generating unit 129 generates an ultrasonic signal for transmitting data to the ultrasonic wireless power transmitter apparatus. The ultrasound generated by the ultrasonic wave generating unit 129 is added up with the signal processed by the signal processing unit 126 to be transferred to the power amplifying unit 128.

The power amplifying unit 128 amplifies a received data signal to an ultrasonic signal having a predetermined magnitude and thereafter, transfers the amplified signal to the ultrasonic transmitter/receiver unit 127.

The ultrasonic transmitter/receiver unit 127 transmits the data signal converted into the ultrasound to the outside or receives the ultrasonic signal transmitted from the external apparatus.

As described above, when the ultrasonic wireless power receiver apparatus of the present disclosure receives the actuation signal from the external ultrasonic wireless power transmitter apparatus, the ultrasonic wireless power receiver apparatus is actuated, checks the power amount stored in the internal power storing unit, and sends the associated data to the external ultrasonic wireless power transmitter apparatus to receive a required power amount. The ultrasonic wireless power receiver apparatus charges power produced by the ultrasonic signal received from the ultrasonic wireless power transmitter apparatus in the power storing unit and returns to the sleep mode when the ultrasonic wireless power receiver apparatus is fully charged.

As ultrasonic frequencies used in the ultrasonic wireless power transmitter apparatus or the ultrasonic wireless power receiver apparatus associated with the present disclosure, a single frequency or a plurality of frequencies may be used, and the ultrasonic transmitter/receiver unit may be made of aluminum, stainless steel or titanium. Of course, the ultrasonic transmitter/receiver unit may be made of other materials in addition to the materials.

The ultrasonic wireless communication system of the present disclosure may actuate the receiver apparatus or transmit/receive the data associated with the power transmitter such as measurement of the power amount by primarily using wireless communication in communications of wireless power transmitter apparatuses in air, and may actuate the receiver apparatus or perform the data communication associated with the power transmitter such as the measurement of the power amount by using ultrasonic communication when the wireless communication is difficult.

If necessary, the ultrasonic wireless communication system of the present disclosure may actuate the receiver apparatus or perform the data communication associated with the power transmitter such as the measurement of the power amount by using the ultrasound in communications of apparatuses positioned under water or communications of apparatuses positioned inside or outside the human body.

Figure 4:
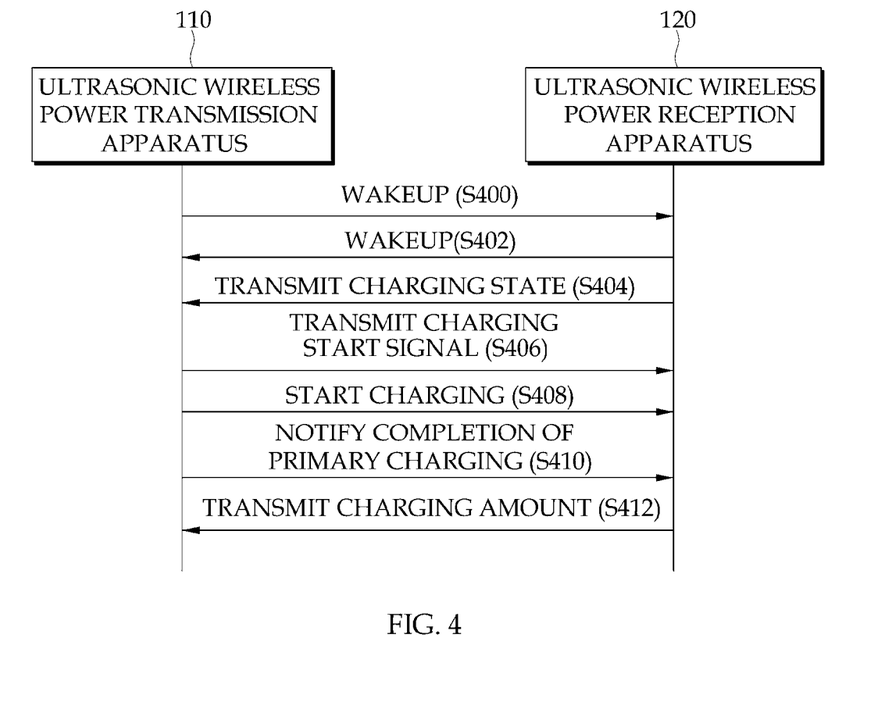
FIG. 4 is a flowchart illustrating a wireless charging operation performed between the ultrasonic wireless power transmitter apparatus and the ultrasonic wireless power receiver apparatus constituting the ultrasonic wireless communication system according to an exemplary embodiment of the present disclosure.

FIG. 4 is a flowchart illustrating a wireless charging operation performed between the ultrasonic wireless power transmitter apparatus and the ultrasonic wireless power receiver apparatus constituting the ultrasonic wireless communication system according to an exemplary embodiment of the present disclosure. Hereinafter, the wireless charging operation performed between the ultrasonic wireless power transmitter apparatus and the ultrasonic wireless power receiver apparatus constituting the ultrasonic wireless communication system according to the exemplary embodiment of the present disclosure will be described in detail with reference to FIG. 4.

In step S400, the ultrasonic wireless power transmitter apparatus transmits the actuation signal for actuating the ultrasonic wireless power receiver apparatus to the ultrasonic wireless power receiver apparatus.

The ultrasonic wireless power receiver apparatus begins to be actuated when receiving the actuation signal from the ultrasonic wireless power transmitter apparatus, and in step S402, the ultrasonic wireless power transmitter apparatus notifies the completion of the actuation to the ultrasonic wireless power transmitter apparatus.

Next, in step S404, the ultrasonic wireless power receiver apparatus transmits the charging mode to the ultrasonic wireless power transmitter apparatus.

The ultrasonic wireless power transmitter apparatus calculates the charging time according to the charging mode received from the ultrasonic wireless power receiver apparatus, and in step S406, the ultrasonic wireless power transmitter apparatus transmits the charging start signal to the ultrasonic wireless power receiver apparatus.

When the ultrasonic wireless power receiver apparatus receives the charging start signal, the ultrasonic wireless power receiver apparatus is switched to the charging mode and notifies the ultrasonic wireless power transmitter apparatus that charging preparation is completed.

The ultrasonic wireless power transmitter apparatus starts charging in step S408 when receiving a charging preparation completion signal from the ultrasonic wireless power receiver apparatus. The ultrasonic wireless power transmitter apparatus generates the ultrasonic signal and amplifies the generated ultrasonic signal to predetermined voltage and thereafter, discharges to the amplified voltage to the outside.

The ultrasonic wireless power transmitter apparatus performs charging for the calculated time and thereafter, in step S410, the ultrasonic wireless power transmitter apparatus notifies the ultrasonic wireless power receiver apparatus that primary charging is completed.

In step S412, the ultrasonic wireless power receiver apparatus verifies the charged amount and thereafter, transmits the charging amount to the ultrasonic wireless power transmitter apparatus.

The ultrasonic wireless power transmitter apparatus performs charging by calculating an additional charging time when charging is short and when the charging is completed, the ultrasonic wireless power transmitter apparatus notifies the ultrasonic wireless power receiver apparatus that the charging is completed.

The ultrasonic wireless power receiver apparatus is changed from the actuation mode to the sleep mode when receiving the charging completion notification, and the ultrasonic wireless power transmitter apparatus also enters the sleep mode.

Figure 5:
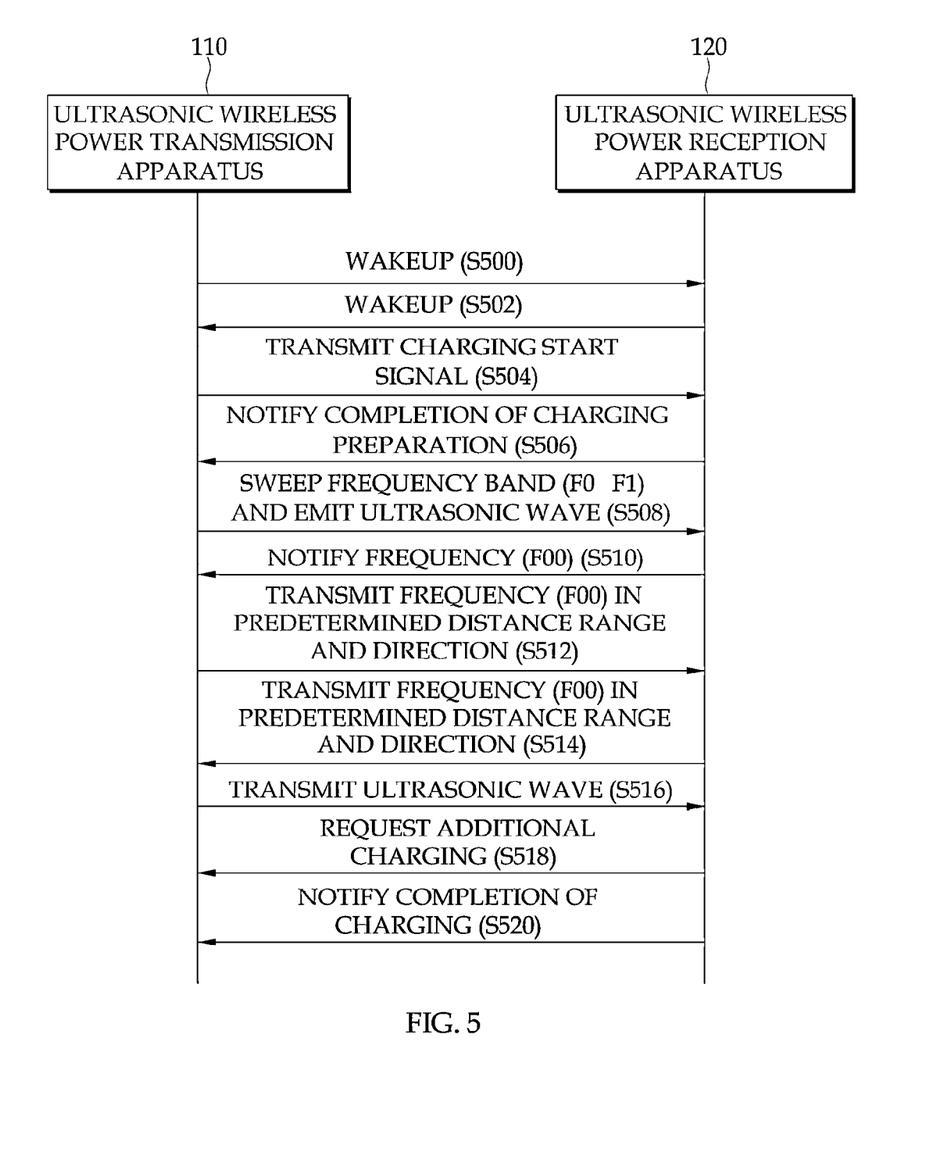
FIG. 5 is a flowchart illustrating a wireless charging operation performed between the ultrasonic wireless power transmitter apparatus and the ultrasonic wireless power receiver apparatus constituting the ultrasonic wireless communication system according to another exemplary embodiment of the present disclosure.

FIG. 5 is a flowchart illustrating a wireless charging operation performed between the ultrasonic wireless power transmitter apparatus and the ultrasonic wireless power receiver apparatus constituting the ultrasonic wireless communication system according to another exemplary embodiment of the present disclosure.

Hereinafter, the wireless charging operation performed between the ultrasonic wireless power transmitter apparatus and the ultrasonic wireless power receiver apparatus constituting the ultrasonic wireless communication system according to the exemplary embodiment of the present disclosure will be described in detail with reference to FIG. 5.

In step S500, the ultrasonic wireless power transmitter apparatus transmits the actuation signal to the ultrasonic wireless power receiver apparatus, in which the ultrasonic wireless power transmitter apparatus transmits the actuation signal to three points P1, P2 and P3 around the ultrasonic wireless power receiver apparatus at a basic natural frequency (F0).

The ultrasonic wireless power receiver apparatus begins to be actuated when receiving the actuation signal from the ultrasonic wireless power transmitter apparatus, and in step S502, the ultrasonic wireless power receiver apparatus notifies the completion of the actuation to the ultrasonic wireless power transmitter apparatus. In this case, the ultrasonic wireless power receiver apparatus notifies a transmitter mode including amplitudes of the ultrasounds P1, P2 and P3 and produced power information received from the ultrasonic wireless power transmitter apparatus and the charging mode of the power storing unit together.

The ultrasonic wireless power transmitter apparatus determines an optimal transmitter direction based on magnitudes of signals of the ultrasounds P1, P2 and P3, calculates the charging time according to the charging mode of the power storing unit, and transmits the charging start signal to the ultrasonic wireless power receiver apparatus in step S504.

When the ultrasonic wireless power receiver apparatus receives the charging start signal, the ultrasonic wireless power receiver apparatus is switched to the charging mode and in step S506, notifies to the ultrasonic wireless power transmitter apparatus that the charging preparation is completed.

Next, the ultrasonic wireless power transmitter apparatus begins to retrieve a natural frequency for charging. In step S508, the ultrasonic wireless power transmitter apparatus sweeps an ultrasonic signal band (F0±F1) in a frequency range around the basic natural frequency (F0) generated from the ultrasound generating unit and amplifies the swept band to predetermined voltage in the power amplifying unit and thereafter, discharges the amplified voltage to the outside through the ultrasonic transmitter/receiver unit, and thereafter, waits for a response signal from the ultrasonic wireless power receiver apparatus.

In step S510, the ultrasonic wireless power receiver apparatus finds a frequency F00 to generate the highest voltage among the ultrasonic signal band (F0±F1) and notifies the frequency F00 to the ultrasonic wireless power transmitter apparatus.

In step S512, the ultrasonic wireless power transmitter apparatus transmits the ultrasound at the frequency F00 to the ultrasonic wireless power receiver apparatus in a predetermined order while changing the position of an ultrasonic element positioned in the ultrasonic transmitter/receiver unit from a current position toward a predetermined distance range (D0±D1) and directions (±θ, ±α) in order to acquire a distance for optimal charging.

Figure 6:
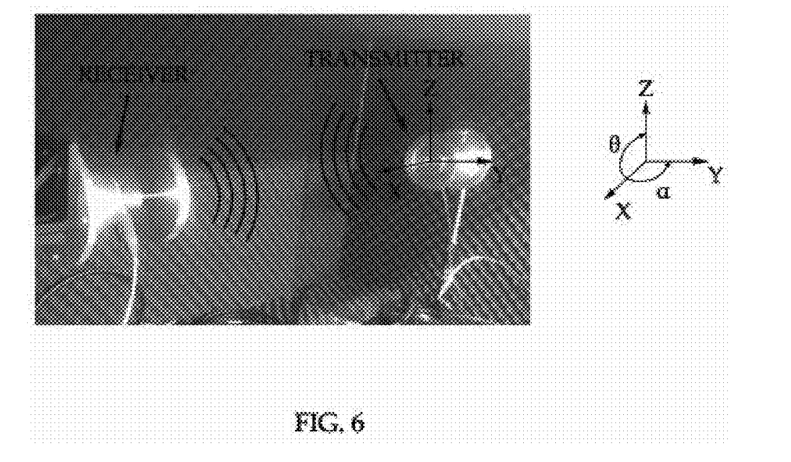
FIG. 6 illustrates an ultrasonic element of the ultrasonic wireless power transmission apparatus in the ultrasonic wireless communication system according to the exemplary embodiment of the present disclosure.

That is, as illustrated in FIG. 6, an ultrasonic wireless power transmitter apparatus Tx transmits the ultrasound to an ultrasonic wireless power receiver apparatus Rx while moving the ultrasonic element to the range of D0±D1 and the directions of ±θ degree in Y axis, ±α degree in Z axis in order to find an optimal charging distance and an optimal charging direction with respect to the ultrasonic wireless power receiver apparatus Rx.

Herein, the position of a transmitter element needs to be transmitted together with the predetermined order while ultrasonic transmitter in the ultrasonic wireless power transmitter apparatus, but a predetermined distance range D0±D1 and an interval DD are set in advance and input into the transmitter and receiver apparatuses in order to reduce an information transmitter time. In a transmitter order, first, the ultrasound is transmitted at the maximum distance, D0−D1, transmitted at a distance of D0−D1+DD, and sequentially transmitted while the distance is increased to D0−D1+(n−1)×DD by DD, and finally the transmitter is terminated at D0+D1.

In step S514, the ultrasonic wireless power receiver apparatus finds an optimal transmitter distance D00 and direction to generate the highest voltage at an ultrasonic frequency F00, and notifies the optimal transmitter distance D00 and direction to the ultrasonic wireless power transmitter apparatus. By notifying an estimated charging time T1 based on the voltage generated at the optimal frequency F00 and the remaining amount of the power storing unit, it is notified that the charging preparation is completed.

In step S516, when the optimal transmitter distance D00 and the estimated charging time T1 are received, the ultrasonic wireless power transmitter apparatus transmits the ultrasound at the optimal frequency F00 for the time T1.

The ultrasonic wireless power receiver apparatus which is charged for the time T1 verifies the charging mode of the power storing unit when the charging is terminated. The ultrasonic wireless power receiver apparatus notifies the completion of the charging to the ultrasonic wireless power transmitter apparatus when the charging is sufficient. If the charging is not sufficient, in step S518, the ultrasonic wireless power receiver apparatus calculates an additionally required charging time Ti and notifies the calculated charging time and request additional charging to the ultrasonic wireless power transmitter apparatus.

When the charging is completed through the primary charging or the additional charging is completed, in step S520, the ultrasonic wireless power receiver apparatus notifies the completion of the charging to the ultrasonic wireless power transmitter apparatus and changes the current mode from the actuation mode to the sleep mode.

The ultrasonic wireless power transmitter apparatus verifies the state of the subsequent ultrasonic wireless power receiver apparatus when receiving the notification of the charging completion from the ultrasonic wireless power receiver apparatus. In this case, when there is the ultrasonic wireless power receiver apparatus to which the ultrasonic wireless power transmitter power transmits the ultrasonic wireless power, the ultrasonic wireless power receiver apparatus transmits the actuation signal to prepare for a new wireless charging work or there is no ultrasonic wireless power receiver apparatus to which the ultrasonic wireless power transmitter power transmits the ultrasonic wireless power, the ultrasonic wireless power receiver apparatus is changed to the sleep mode.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. An ultrasonic wireless power transmission apparatus, comprising:
   an ultrasound generating unit configured to generate an ultrasonic signal for transmitting electric power;
   a signal processing unit configured to modulate the ultrasonic signal;
   a power amplifying unit configured to amplify the modulated ultrasonic signal to a predetermined magnitude;
   an ultrasonic transmitter/receiver unit configured to send the power-amplified ultrasonic signal to an ultrasonic wireless power receiver apparatus or receive the power- amplified ultrasonic signal from the ultrasonic wireless power transmitter apparatus; and a control unit configured to calculate a charging time using power amount data received from the ultrasonic wireless power receiver apparatus and calculate a natural frequency using a distance to the ultrasonic wireless power receiver apparatus and a size of a radiation plate of the ultrasonic transmitter/receiver unit.

2. The apparatus of claim 1, wherein the control unit sends an wakeup signal to the ultrasonic wireless power receiver apparatus to start.

3. The apparatus of claim 1, wherein, when the control unit transmits a charging start signal to the ultrasonic wireless power receiver apparatus and receives a notification of completion of charging preparation from the ultrasonic wireless power receiver apparatus, the control unit charges the power storing unit in the ultrasonic wireless power receiver apparatus with the ultrasound with the natural frequency for the charging time.

4. The apparatus of claim 1, wherein the ultrasonic transmitter/receiver apparatus is made of at least one material of aluminum, stainless steel and titanium.

5. The apparatus of claim 1, wherein the transducer in the ultrasonic transmitter/receiver apparatus is made of at least one or more PZT elements.

6. The apparatus of claim 1, wherein the control unit enters a sleep mode when the power amount required in the ultrasonic wireless power receiver apparatus is charged.

7. An ultrasonic wireless power receiver apparatus, comprising:
an ultrasonic transmitter/receiver unit configured to receive an ultrasonic signal for transmitting power from an ultrasonic wireless power transmitter apparatus or transmit an ultrasonic signal for transmitting data to the ultrasonic wireless power transmitter apparatus;
a power managing unit configured to store power generated using the ultrasonic signal for transmitting power in a power storing unit and measure a power amount stored in the power storing unit; and
a control unit configured to:
control power amount data received from the power managing unit to be transmitted to the ultrasonic wireless power transmitter apparatus,
when a wakeup signal is received from the ultrasonic wireless power transmitter apparatus, actuate the ultrasonic wireless power receiver apparatus and transmit, to the ultrasonic wireless power transmitter apparatus by using the ultrasonic wireless power receiver apparatus, charging mode and charging state data, and
when a charging completion signal is received from the ultrasonic wireless power transmitter apparatus, transmit, to the ultrasonic wireless power transmitter apparatus by using the ultrasonic wireless power receiver apparatus, charged amount data.

8. The apparatus of claim 7, further comprising:
ultrasound generating unit configured to generate an ultrasonic signal for transmitting the power amount data;
a signal processing unit configured to modulate the ultrasonic signal output from the ultrasound generating unit; and
a power amplifier configured to amplify the ultrasonic signal output from the signal processing unit to a predetermined magnitude.

9. A method for wireless charging using ultrasound in an ultrasonic wireless power transmitter apparatus, comprising:

transmitting, by an ultrasonic wireless power transmitter apparatus, an wakeup signal to an ultrasonic wireless power receiver apparatus;
calculating, by the ultrasonic wireless power transmitter apparatus, a charging time according to a charging status information received from the ultrasonic wireless power receiver apparatus, and transmitting a charging start signal to the ultrasonic wireless power receiver apparatus;
generating, by the ultrasonic wireless power transmitter apparatus, an ultrasonic signal, amplifying the generated ultrasonic signal to predetermined voltage and thereafter, sending the ultrasound with the amplified voltage to the ultrasonic wireless power receiver apparatus when receiving a notification of completion of charging preparation from the ultrasonic wireless power receiver apparatus;
charging, by the ultrasonic wireless power transmitter apparatus, the ultrasonic wireless power receiver apparatus for the calculated charging time and thereafter, notifying the ultrasonic wireless power receiver apparatus that primary charging is completed;
receiving, by the ultrasonic wireless power transmitter apparatus, charged status information generated in response to the notification that primary charging is complete, and
determining, by the ultrasonic wireless power transmitter apparatus, whether secondary charging is to be performed according to the charged status information received from the ultrasonic wireless power receiver apparatus.

10. The method of claim 9, wherein, in the determining of whether the secondary charging is to be performed, the ultrasonic wireless power transmitter apparatus checks the charged status information whether to perform additional charging by calculating an additional charging time when the charging is not sufficient or notify completion of charging to the ultrasonic wireless power receiver apparatus when the charging is sufficient.

11. A method for wireless charging using ultrasound in an ultrasonic wireless power transmitter apparatus, comprising:
transmitting, by an ultrasonic wireless power transmitter apparatus, an wakeup signal to an ultrasonic wireless power receiver apparatus;
transmitting, by the ultrasonic wireless power transmitter apparatus, a charging start signal to the ultrasonic wireless power receiver apparatus when receiving a notification of completion of wakeup and a charged status information from the ultrasonic wireless power receiver apparatus;
emitting, by the ultrasonic wireless power transmitter apparatus, ultrasound in a predetermined range when receiving a notification of completion of receiving ready from the ultrasonic wireless power receiver apparatus;
receiving, by the ultrasonic wireless power transmitter apparatus, a notification of a frequency to generate the highest voltage from the ultrasonic wireless power receiver apparatus;
transmitting, by the ultrasonic wireless power transmitter apparatus, ultrasound with the notified frequency while changing the position of an ultrasonic element within the range of a predetermined distance (D0±D1) and direction (±θ, ±α);
receiving, by the ultrasonic wireless power transmitter apparatus from the ultrasonic wireless power receiver apparatus, an optimal transmitter distance and direction and an estimated charging time; and transmitting, by the ultrasonic wireless power transmitter apparatus, the ultrasound having the notified frequency and charging the ultrasonic wireless power receiver apparatus for the estimated charging time after setting the position of the ultrasonic element to the optimal transmitter distance and direction.

12. The method of claim 11, wherein, in the transmitting of the ultrasound, the ultrasound having the notified frequency is transmitted while the position of the ultrasonic element is sequentially increased from a current position to a predetermined distance (DD).

13. The method of claim 11, wherein, after the charging, when the ultrasonic wireless power transmitter apparatus receives a notification of the completion of charging from the ultrasonic wireless power receiver apparatus, the ultrasonic wireless power transmitter apparatus transmits the wakeup signal to a subsequent ultrasonic wireless power receiver apparatus or enters a sleep mode.

14. The method of claim 11, wherein, after the charging, when the ultrasonic wireless power transmitter apparatus receives an additional charging time and a request for additional charging from the ultrasonic wireless power receiver apparatus, the ultrasonic wireless power transmitter apparatus performs charging for the additional charging time.

* * * * *